Figure 5:
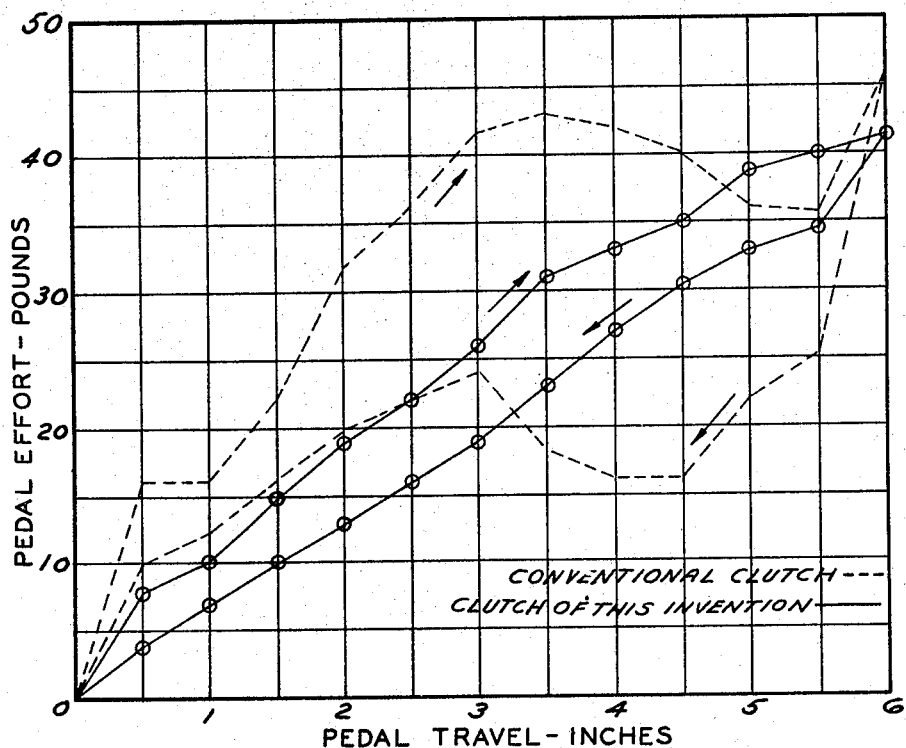

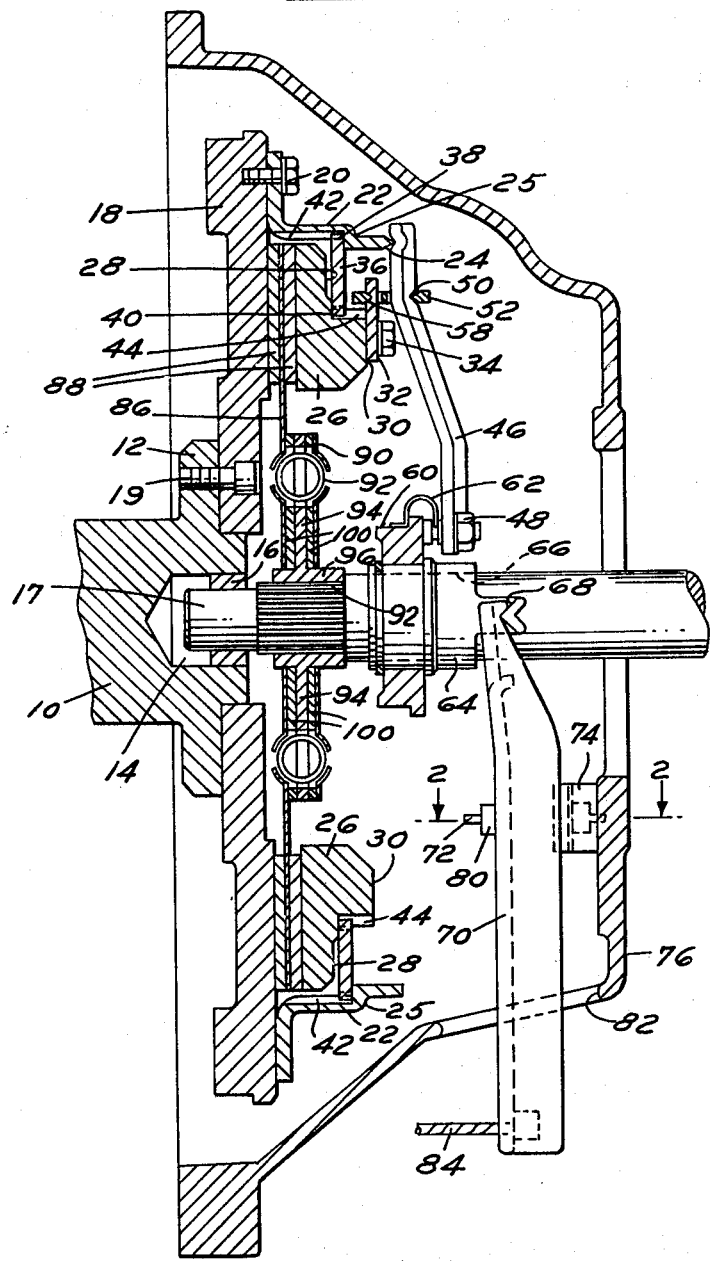

July 16, 1968  R. E. KAPTUR ET AL  3,392,812
CLUTCH LEVER WITH CABLE FULCRUM
Filed Dec. 2, 1966  3 Sheets-Sheet 2
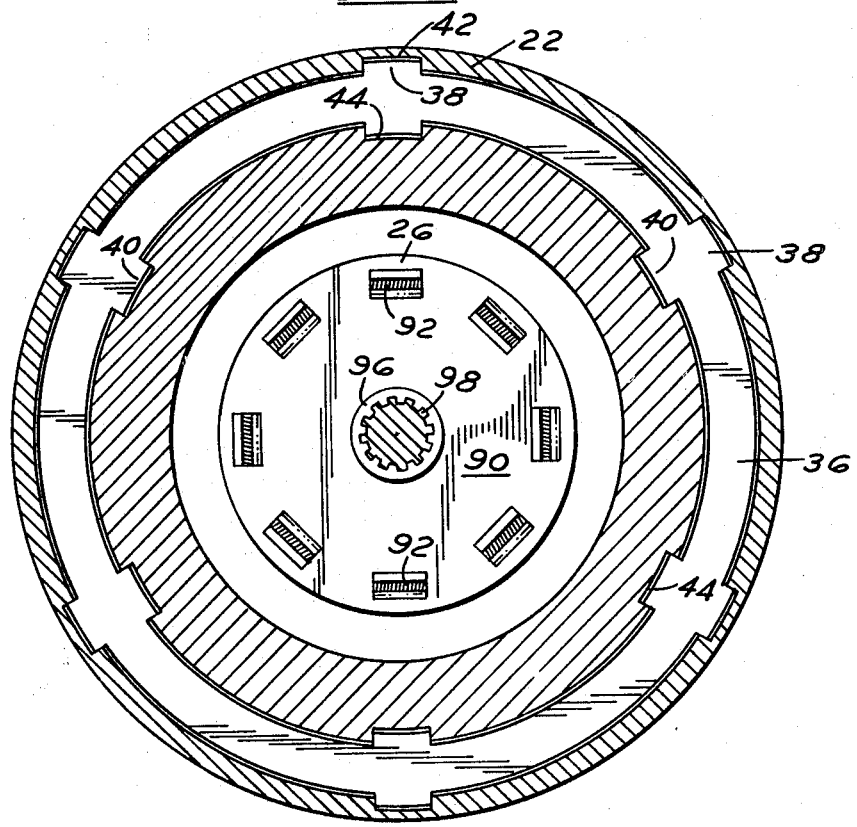
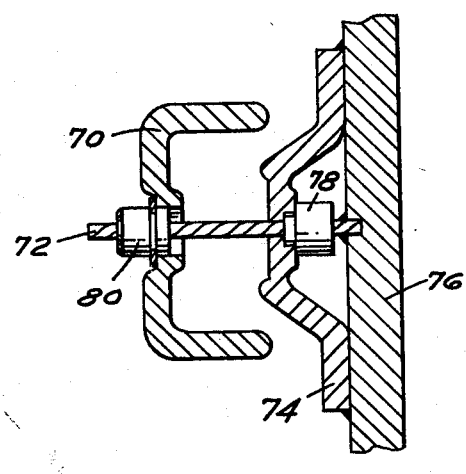
INVENTORS
ROBERT E. KAPTUR
HOWARD M. PILON
BY
John R. Faulkner
Glenn S. Arendsen
ATTORNEYS July 16, 1968 R. E. KAPTUR ET AL 3,392,812
CLUTCH LEVER WITH CABLE FULCRUM
Filed Dec. 2, 1966 3 Sheets-Sheet 3

INVENTORS
ROBERT E. KAPTUR
HOWARD M. PILON
BY
John R. Faulkner
Glenn S. Arendsen
ATTORNEYS

Patent 3,392,812 — Clutch Lever with Cable Fulcrum

3,392,812
CLUTCH LEVER WITH CABLE FULCRUM
Robert E. Kaptur, Birmingham, and Howard M. Pilon, Allen Park, Mich., assignors to Ford Motor Company, Dearborn, Mich., a corporation of Delaware
Filed Dec. 2, 1966, Ser. No. 598,852
9 Claims. (Cl. 192—99)

This invention provides a clutch having reduced friction in its actuating mechanism and improved pedal sensitivity to the relationship between the driving and driven members. The clutch is useful particularly in automotive applications.

In conventional clutches, the clutch actuating lever pivots on a stud fastened to the clutch housing and the throwout bearing is positioned by a sleeve sliding on a transmission extension. Coil springs located between the pressure plate and a pressure plate cover provide the clutch engaging force. High friction tends to develop between the actuating lever and its mounting stud and between the bearing sleeve and the transmission extension. This friction acts against the operator when the clutch pedal is being depressed to disengage the clutch but reverses when the clutch is being engaged; thus, considerable divergence between disengagement and engagement exists in the sensitivity of the pedal. Another disadvantage of conventional constructions lies in the difficulty of assembling the coil springs into the clutch. Moreover, engaging effort provided by the coil springs changes significantly as friction material wear changes the amount of compression of the coil springs.

The clutch of this invention reduces friction in its actuating mechanism by using a cable to provide the fulcrum for the actuating lever. Greater motion freedom is imparted to the throwout bearing so the bearing tends to position itself without requiring guidance from the transmission extension, especially when the release bearing is supported on a plurality of arms rotating with the driving member. Typically, the clutch of this invention has a driving member, a driven member, a pressure element for engaging and disengaging those members and an actuating mechanism. The actuating mechanism comprises an actuating lever connected operatively to the pressure element that is capable of moving the pressure element to connect and disconnect the driving member with the driven member and a cable providing the fulcrum for the actuating lever.

Additional motion freedom is imparted to the clutch of this invention by the use of a Belleville washer to provide the engaging force, position the clutch pressure plate and transmit driving torque thereto. Tangs on the inner and outer peripheries fit into slots in a support cover fastened to the driving means and in the pressure plate to perform the positioning and transmitting functions. Both the Belleville washer and the pressure plate can float within limits established by radial clearances between tangs and slots. Clutch assembly is simplified since the single Belleville washer replaces the plurality of coil springs used previously.

Figure 4:
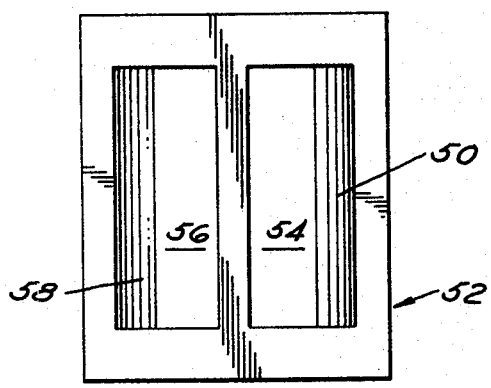

Further details of contruction and operations of the clutch of this invention are presented in the following detailed description of the structure shown in the drawings. In the drawings, FIGURE 1 is a side cross-sectional view of a clutch of this invention showing a portion of the engine crankshaft and the floating nature of the clutch release bearing. FIGURE 2 is a cross section taken along line 2—2 of FIGURE 1 showing the cable providing the fulcrum for the actuating lever. FIGURE 3 shows the Belleville washer used to provide the engaging force on the pressure plate and the tangs on the inner and outer peripheries of the Belleville washer that position and transmit driving torque to the pressure plate. FIGURE 4 shows a buckle used to link the arms with the pressure plate, and FIGURE 5 is a graph of test data comparing pedal effort of a clutch of this invention with a conventional clutch having much higher linkage friction.

Referring to FIGURE 1, the end of an engine crankshaft 10 has a radial flange 12 formed on its lower surface. A concentric hole 14 is drilled into crankshaft 10 and a locating bearing 16 for the transmission input shaft 17 is positioned in hole 14.

A flywheel 18, the driving member, is fastened to flange 12 by conventional means such as threaded fasteners 19. Conventional threaded fasteners 20 attach the rim of a dish-shaped support cover 22 to the radial surface of flywheel 18 near its outer edge. Support cover 22 is open at its bottom and has three knife edges, one of which is shown at numeral 24, spaced equally around its bottom. The intermediate wall of cover 22 contains one step 25.

Located radially inward of cover 22 is a pressure plate 26 having its rear surface stepped into lower outside portion 28 and higher inside portion 30. Three lugs, one of which is shown at numeral 32, are fastened on surface 30 by conventional threaded fasteners 34 and project slightly outward over portion 28.

A Belleville washer 36 has its outer periphery seating on step 25 in cover 22 and its inner periphery seating on portion 28 of pressure plate 26. Turning for a moment to FIGURE 3, Belleville washer 36 has a plurality of tangs 38 on its outer periphery and similar tangs 40 on its inner periphery. Tangs 38 locate in a plurality of grooves 42 formed on the inner surface of cover 22 while tangs 40 locate in corresponding grooves 44 formed in the circumferential surface of pressure plate 26 between portions 28 and 30. Belleville washer 36 is installed so its spring force urges pressure plate 26 toward flywheel 18.

Arm 46, one of three spaced equally, pivots at its outer end on knife edge 24 and has a stud 48 fastened to its inner end. At an intermediate portion, arm 46 contacts a knife edge 50 of a buckle 52. Turning for a moment to FIGURE 4, buckle 52 has two openings 54 and 56 with knife edge 50 being formed on the outer side of opening 54 and a similar knife edge 58 being formed on the outer side of opening 56. Arm 46 passes through opening 54 while lug 32 passes through opening 56 and contacts knife edge 58.

A throwout bearing 60 has three tangs 62 spaced equally at its rear surface. Tangs 62 engage studs 48 so the three arms 46 hold bearing 60 in position. Bearing 60 is mounted on a sleeve 64 that has a passage 66 therethrough. Two knife edges 68, one of which is shown, are formed at the rear edge of sleeve 64 radially outward of passage 66.

The inner end of an actuating lever 70 is forked to contact knife edges 68. Referring for a moment to FIGURE 2, lever 70 is pivoted at an intermediate point by a cable 72. A bracket 74 is fastened to housing 76 and clamps 78 and 80 anchor cable 72 to bracket 74 and lever 70 respectively. The outer end of lever 70 projects through a radial opening 82 in housing 76 and is fastened outside of housing 76 to a cable 84 from the clutch pedal assembly (not shown).

A clutch plate 86, the driven member, has frictional material 88 on each side interposed between pressure plate 26 and flywheel 18. Radially inward from material 88, clutch plate 86 and an auxiliary plate 90 form an enclosure for a plurality of springs 92, one of which is shown. Plates 86 and 90 bear on one end of spring 92. The web 94 of a hub 96 is positioned between plates 86 and 90 and bears on the other end of spring 92. Spacers 100 are positioned between web 94 and plates 86 and 90, and the interior surface of hub 96 is splined as at 98 to receive a transmission input shaft 17.

Operation

All components numbered 18 through 62 rotate with the engine crankshaft 10. Tangs 38 and 40 drive the Belleville washer 36 and the pressure plate 26 from cover 22. Relative motion within bearing 60 permits sleeve 64 and lever 70 to remain stationary with housing 76.

With the clutch engaged, torque is transmitted from flywheel 18 through friction material 88 to clutch plate 86 and from flywheel 18 through cover 22, Belleville washer 36, and pressure plate 26 through friction material 88 to clutch plate 86. Torque at clutch plate 86 passes through springs 92, web 94 and hub 96 to the transmission input shaft 17.

To disengage the clutch, a force is applied through cable 84 to pull the outer end of lever 70 to the left in FIGURE 1. Lever 70 pivots about the fulcrum provided by cable 72 to move bearing sleeve 64 and bearing 60 to the right. Arms 46 pivot on knife edges 24 and act through buckle 52 to pull pressure plate 26 away from friction material 88, thereby disengaging clutch plate 86 from pressure plate 26 and flywheel 18.

FIGURE 5 compares effort envelopes of a current production clutch and the clutch of this invention. The reduced friction in the clutch of this invention narrows the envelope so clutch feel during engagement is more compatible with clutch feel during disengagement. Using a Belleville washer to supply the engaging force aids in improving the linearity of the clutch of this invention.

Centrifugal loading can be provided in the clutch of this invention by replacing knife edges 24 with pivot pins and supporting centrifugally responsive weights on the pivot pins. Thus this invention provides a clutch in which a cable provides a fulcrum for the actuating lever, thereby permitting the release bearing to float without need for the mechanical guidance provided previously by a transmission extension. The Belleville washer positions the pressure plate, provides the driving link betwen the flywheel and the pressure plate and also provides the clutch engaging force.

What is claimed is:

1. In a clutch having a driving member, a driven member and a pressure element for engaging and disengaging said members with each other, an actuating mechanism comprising
an actuating lever connected operatively to said pressure element and adapted to move the pressure element to connect and disconnect said members, and cable means providing a fulcrum for said lever.

2. The clutch of claim 1 comprising
a floating release bearing that is contacted by said actuating lever, and
a plurality of arms attached to said driving member, said arms positioning said release bearing.

3. The clutch of claim 2 in which the driving member is a disc having a support cover fastened to one side, said arms pivoting on said support cover.

4. The clutch of claim 3 comprising a Belleville washer anchored in said support cover and bearing on said pressure element.

5. The clutch of claim 4 in which the Belleville washer has transmitting means at its inner and outer peripheries for transmitting rotational torque from said support cover to said pressure element.

6. The clutch of claim 5 in which the transmitting means comprise a plurality of tangs on the inner and outer peripheries of the Belleville washer, said tangs positioning in slots in the support cover and the pressure element respectively.

7. The clutch of claim 6 comprising buckle means connecting said arms to said pressure element.

8. The clutch of claim 1 comprising a Belleville washer anchored in said driving member and applying a connecting load to said pressure element.

9. The clutch of claim 8 in which the Belleville washer has transmitting means at its inner and outer peripheries for transmitting rotational torque from the driving member to the pressure element.

References Cited
UNITED STATES PATENTS

| | | |
|---|---|---|
| 1,887,776 | 11/1932 | Morral. |
| 2,026,945 | 1/1936 | Lane. |
| 2,073,146 | 3/1937 | Gardiner _____ 192 — 89 |
| 3,167,163 | 1/1965 | Smirl et al. |

BENJAMIN W. WYCHE III, *Primary Examiner.*